United States Patent [19]

Zwirn

[11] Patent Number: 5,023,719
[45] Date of Patent: Jun. 11, 1991

[54] IMAGING SYSTEM FOR PROVIDING MULTIPLE SIMULTANEOUS REAL TIME IMAGES

[75] Inventor: Robert Zwirn, Los Angeles, Calif.

[73] Assignee: Hughes Aircraft Company, Los Angeles, Calif.

[21] Appl. No.: 422,356

[22] Filed: Oct. 16, 1989

[51] Int. Cl.[5] .................. H04N 3/223; H04N 7/18; H04N 5/33; H04N 3/32
[52] U.S. Cl. .................................. 358/180; 358/108; 358/113; 358/137
[58] Field of Search .................. 358/93, 22, 185, 108, 358/137, 180, 113

[56] References Cited

U.S. PATENT DOCUMENTS

| | | | |
|---|---|---|---|
| 4,199,785 | 4/1980 | McCullough et al. | 358/180 |
| 4,249,211 | 2/1981 | Baba et al. | 358/180 |
| 4,257,044 | 3/1981 | Fukuoka | 358/180 |
| 4,321,066 | 10/1980 | Merchant | 358/180 |
| 4,517,599 | 5/1985 | Zwirn et al. | 358/166 |
| 4,528,585 | 7/1985 | Bolger | 358/180 |
| 4,722,007 | 1/1988 | Fling | 358/180 |
| 4,792,856 | 12/1988 | Shiratsuchi | 358/180 |
| 4,891,702 | 11/1990 | Nakayama et al. | 358/180 |

Primary Examiner—Stephen C. Buczinski
Attorney, Agent, or Firm—William J. Streeter; Wanda K. Denson-Low

[57] ABSTRACT

A system for providing multiple simultaneous real time image from a single image sensor. The imaging system 10 is adapted for use with an image sensor 12 which provides a first set of electrical signals in response to inputs received thereby from a scene. The system 10 includes a processor 16 for processing the first set of electrical signals to provide a second set of electrical signals and a display 18 for displaying the combination of unzoomed portions of the scene plus enhanced views of other portions of the scene as represented by the second set of electrical signals.

In a preferred embodiment, the processor includes circuitry for increasing the sampling rate of the image sensor 12 and a deconvolver 30 for processing the highly sampled signals such that the enhanced views of portions of the scene are high-resolution magnifield views of those portions of the scene.

25 Claims, 3 Drawing Sheets

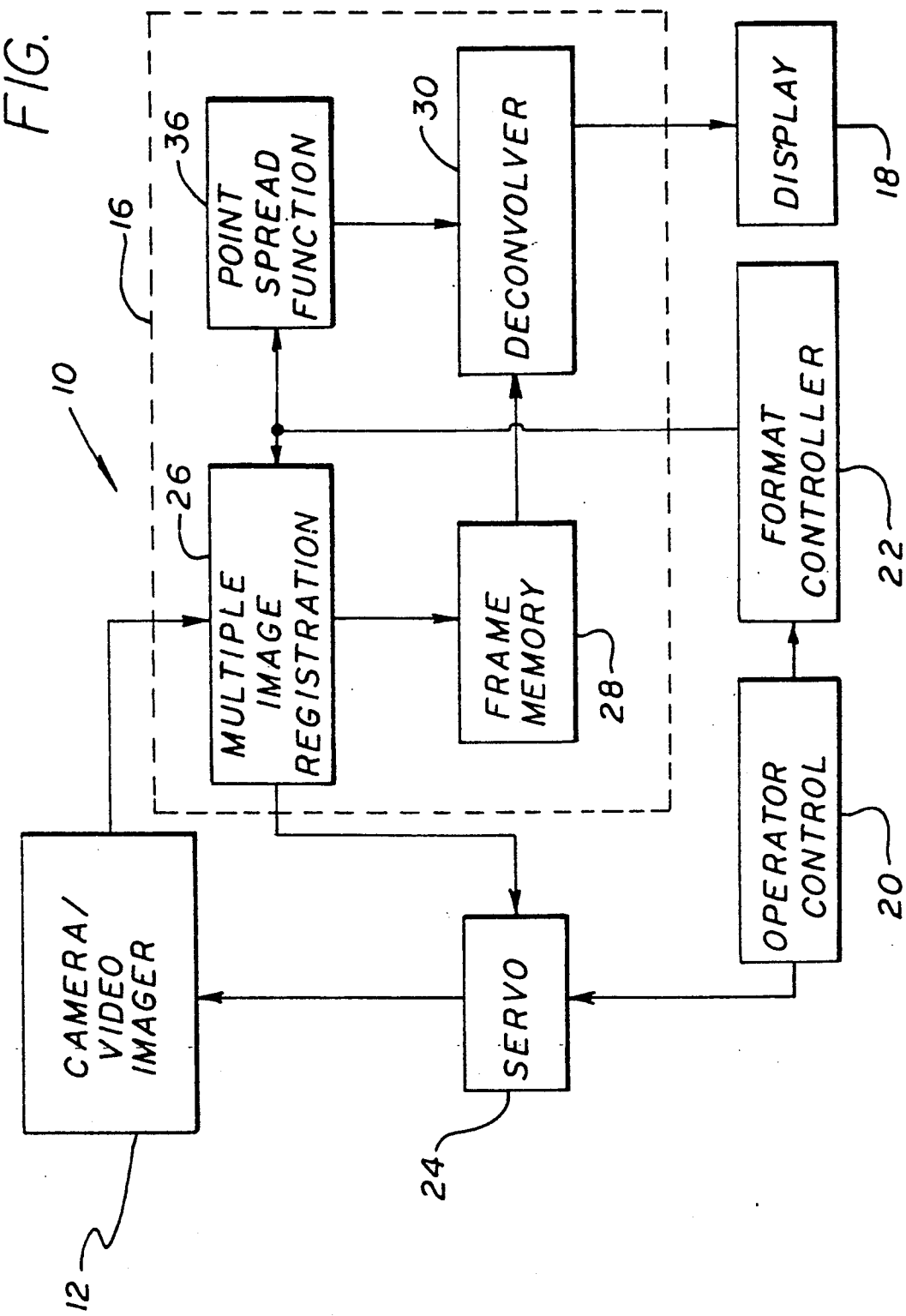

IMAGING SYSTEM FOR PROVIDING MULTIPLE SIMULTANEOUS REAL TIME IMAGES

BACKGROUND OF THE INVENTION

1. Field of the Invention:

The present invention relates to imaging systems. More specifically, the present invention relates to systems for providing multiple simultaneous images.

While the present invention is described herein with reference to a particular embodiment for an illustrative application, it is understood that the invention is not limited thereto. Those having ordinary skill in the art and access to the teaching provided herein will recognize additional modifications, applications and embodiments within the scope thereof.

2. Description of the Related Art:

In many applications there is a need to provide a wide angle view and also one or more high resolution zoom views. This normally requires one sensor per view. It would be advantageous to provide all of these views from a single sensor. For example, in forward looking infrared (FLIR) systems many situations arise in which simultaneous wide angle and zoom views of a scene would be desirable. A wide angle view may be used to find and designate targets while zoom views of each of the targets may be used to identify each target and aim the weaponry if necessary. For example, a driver may require a wide angle field-of-view and a gunner may require simultaneous zoom views of particular portions of a scene.

Previously, in order to achieve both a wide angle field-of-view and one or more zoom views, imaging systems required one set of lenses and associated optical equipment for each field-of-view desired. Typified by boresighted optical fields-of-view, these systems often included an optical field-of-view switch which would be activated whenever the operator desired an alternate view. Unfortunately, there are several limitations associated with the simple provision of sequential optical arrangements to provide sequential fields-of-view of an object in real time.

To the extent that systems equipped with such sequential optical arrangements provide sequential images of a scene, the zoomed image is generally confined to the center of the wide angle field-of-view. This common boresight limitation prevents a second operator from zooming in on a portion of the image near the border of the wide angle field-of-view.

In addition, a particularly significant limitation of the sequential optical arrangement approach is that these systems do not provide simultaneous images per se. That is, as only one set of optics may be selected at a time, only one view is available at a time. This is an obvious limitation in situations in which it is desirable to provide a field-of-view for more than one operator at a time such as for military systems.

An additional limitation of the sequential optical arrangement approach is that the magnification of the lenses is usually fixed and discretely limited. Only one magnification is available at a time.

Multiple simultaneous optical arrangements overcome some of the problems associated with sequential optical arrangements by providing multiple simultaneous images, but these systems can add significantly to the cost, size and weight of an imaging system. (This is particularly problematic with respect to FLIR systems which are generally expensive). These systems are generally mechanically complex and have close manufacturing tolerances which require precision assembly and maintenance. Further, multiple simultaneous optical arrangements generally increase the weight on the gimbal supporting the sensor and thereby limit the performance of the host system. When the optical arrangements share a common focal plane, they reduce scan efficiency (since each view utilizes only a fraction of the scan).

Finally, there are many systems in the field for which this capability of displaying multiple simultaneous images would be desirable. Yet, the retrofit of existing systems to provide this limited conventional capability would be too expensive to provide a practical option.

Providing multiple fields-of-view from a single optical arrangement solves many of the problems associated with multiple simultaneous optical arrangements. For example, copending U.S. Pat. application Ser. No. 07311785, filed by R. Zwirn on Feb. 14, 1989, discloses a technique for accomplishing simultaneous fields-of-view from a single optical arrangement. However, this system requires one display for each field-of-view.

Thus, there is a need in the art for an inexpensive nonmechanical system or technique for providing multiple simultaneous real time images with varying fields-of-view on a single display. Ideally, the system would allow for a ready (noninvasive) retrofit into existing systems and would not degrade the performance thereof.

SUMMARY OF THE INVENTION

The need in the art is addressed by the system of the present invention which provides multiple simultaneous real time images from a single image sensor. The system is adapted for use with an image sensor which provides a first set of electrical signals in response to electromagnetic energy received thereby from a scene. The system includes a processor for processing the first set of electrical signals to provide a second set of electrical signals and at least one display for displaying the combination of unzoomed portions of the scene plus enhanced views of other portions of the scene represented by the second set of electrical signals.

In a preferred embodiment, the processor includes circuitry for increasing the sampling rate of the image sensor and a deconvolver for processing the highly sampled signals such that the enhanced views of portions of the scene are high resolution magnified views of those portions of the scene.

BRIEF DESCRIPTION OF THE DRAWINGS

FIG. 1 shows a block diagram of an illustrative embodiment of the imaging system of the present invention.

DESCRIPTION OF THE INVENTION

Figure 2A:
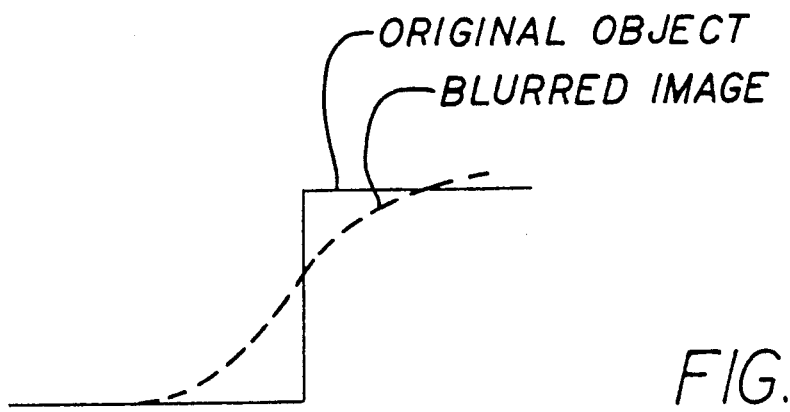
FIG. 2(a) shows the intensity, as a function of position across the image plane of the sensor utilized in the present invention, of an original object and its blurred image.

FIG. 1 shows a block diagram of an illustrative embodiment of the imaging system 10 of the present invention. The system 10 includes a conventional television camera or video imager 12 which provides a first set of electrical output signals representative of a scene within the field-of-view thereof. Any type of television camera or video imager may be used. In the preferred embodiment, the television camera or video imager 12 is a nonintegrating type imager such as a forward looking infrared (FLIR) sensor.

In the illustrative embodiment of FIG. 1, the output of camera 12 is provided to an image processor 16. The image processor 16 generates a second set of electrical signals which, in the preferred embodiment, is representative of a combination of a wide angle view from camera 12 plus one or more sharp, high resolution, magnified views of a portion of the wide angle view. The output of the processor 16 is provided to a display 18 which simultaneously displays to the operator the wide angle view from the camera 12 including the zoom views. Those skilled in the art will recognize that the resolution of the camera 12, the image processor 16 and the display 18 can vary without departing from the scope of the present invention. Furthermore, the size of the wide angle field-of-view and the zoom magnification factors may vary without departing from the scope of the present invention.

The processor 16 includes a multiple image registration circuit 26, a frame memory 28, a deconvolver 30 and a point spread function circuit 36. The system 10 further includes an operator control 20 for selecting the areas to be zoomed and a format controller 22 to provide the necessary control signals to the processor 16 to control the zooming. In addition, the system 10 includes a servo 24 to control the pointing angle of the camera 12. The operator control 20 may be implemented with a joystick or a light pen. The format controller 22 may be implemented with digital buffers. Those skilled in the art will recognize that other methods may be utilized to implement the operator control 20 and the format controller 26 without departing from the scope of the present invention.

In operation, the operator selects the field-of-view of the camera 12 through the operator control 20. The control 20 controls the pointing angle of the camera 12 through the servo 24. Those skilled in the art will recognize that the type of servo used may vary without departing from the scope of the present invention. The operator also selects through the control 20 the areas of the wide angle view which are to be zoomed. The number of zoom areas that may be selected is limited only by the number of zoom views that can be displayed on a screen. The control 20 provides this information to the format controller 22. The format controller 22 controls the image processor 16 which in turn also controls the servo 24.

The format controller 22 controls the image processor 16 by providing signals indicating where the processor 16 is to output signals corresponding to a wide angle view of the camera 12 and where the processor 16 is to output signals corresponding to a zoom view of a portion of the wide angle view of the camera 12. Where a zoom view is required, the image processor 16 increases the sampling rate of the camera 12 above the Nyquist criterion and deconvolves the highly sampled signals such that for the selected portion of the display the second set of electrical signals corresponds to the sharp, high resolution, magnified view of a portion of the wide angle view of the camera 12.

U.S. Pat. No. 4,517,599, issued to R. Zwirn et. al. on May 14, 1985, (the teaching of which is incorporated herein by reference) discloses a technique for processing the output of the camera 12 to provide such an enhanced image. The increased sampling of a portion of the scene is provided by the multiple image registration circuit 26 which produces a multiply-registered portion of a video frame consisting of a plurality of subpixels of reduced area from a smaller plurality of normal video frames provided by the camera 12. The image motion or camera jitter between subsequent normal video frames determines the subpixel displacement in the multiply-registered portion of the video frame. In effect, the multiple image registration circuit 26 forms a mosaic of displaced subpixels of successive video frames generated by the camera 12.

Implementation of multiple image registration in existing system hardware may be accomplished using a correlation tracker, image motion compensating servo error or camera platform-stabilizing gyro error. The multiple image registration circuit 26 typically includes provision for deviating the addresses into which correspondingly displaced pixel data are placed in the frame memory 28. It will be appreciated by those skilled in the art that other techniques may be used to increase the sampling rate of the camera including the use of smaller detectors to achieve dense sampling in a single frame.

The multiple image registration circuit 26 receives control signals from the format controller 22 and outputs intentional displacements to the servo 24 and address shifts to the frame memory 28. The frame memory 28 stores the multiply-registered portions of video frames produced by the multiple image registration circuit 26 combined with the remaining normal portions of the video frames produced by the camera 12. Where the operator indicates that the wide angle view of the camera 12 is to be displayed, the multiple image registration circuit 26 simply passes this data through to the frame memory 28 at its original addresses. Where the operator indicates that a zoom view of a portion of the wide angle view is to be displayed, the multiple image registration circuit 26 operates as outlined above to generate a mosaic of subpixels representing this zoom view.

Normal video is stored in the frame memory 28 as contiguous samples received from the camera 12 through the registration circuit 26. However, multiple registered video is stored discontinuously in the frame memory 28. The magnification factor determines how the multiply-registered pixels are distributed. For example, for magnification by two, every other address and every other line are skipped as the video data is being stored. A one-half pixel shift horizontally in the line-of-sight of the camera 12 before the next frame then allows the alternate addresses that were skipped along those lines to be filled in. Filling in the missing rows requires a one-half pixel shift vertically in the line of sight and a full pixel shift in the memory addresses vertically to fill in every other pixel in the skipped rows. Last of all, a one-half pixel shift horizontally before the next frame will allow the missing pixels in the previously skipped rows to be filled in. A total of four video frames is required to initially fill in the video memory 28.

In a similar manner, magnification by three requires that every third pixel and every third line be filled in during each frame, and that there be a one-third pixel shift in the line-of-sight of the camera 12 before each subsequent frame. Thus, magnification by three requires nine video frames to initially fill the video memory 28. The format controller 22 provides the coordinates to the frame memory 28 to control the storage of the video data therein. The multiple image registration circuit 26 provides signals to the servo 24 to control the required pixel offset and direction of offset before each subsequent video frame.

The data in the video memory 28 representing the combined wide angle view and the selected zoom views is generally filtered before being displayed on the display 18. In the preferred embodiment, the filters will vary depending upon the point spread function of the selected video system. Thus, there will be one filter for portions of the display representing the wide angle view and one filter for each portion of the display representing a particular zoom magnification. The deconvolver 30 in the image processor 16 provides such filtering. The point spread function circuitry 36 provides the deconvolver 30 with the appropriate point spread function coefficients corresponding to the magnification factor of the portion of the display being filtered.

The format controller 22 provides signals to the point spread function circuit 36 and to the deconvolver 30 to indicate which portion of the display is being filtered and, thus, the appropriate filter to use. The output of the deconvolver 30 is a second set of electrical output signals representing the wide angle view containing selected zoom views for display on the display 18. Those skilled in the art will recognize that a variety of different filters may be used without departing from the scope of the present invention.

Figure 2B:
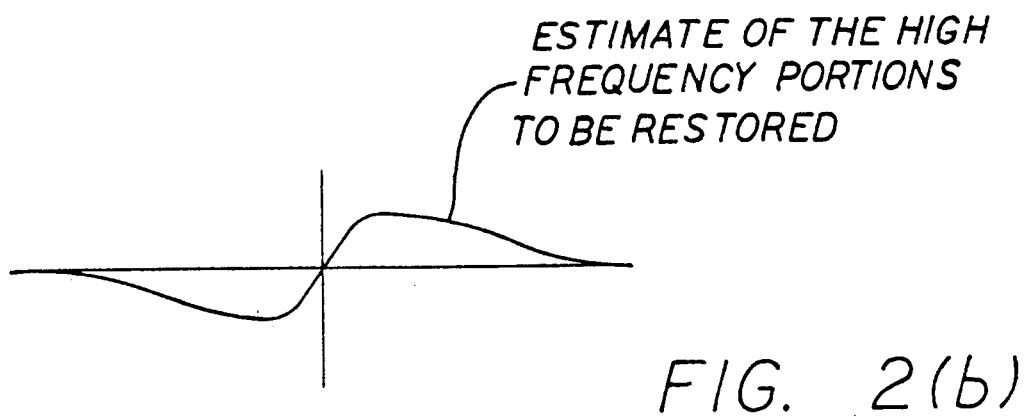
FIG. 2(b) depicts the high frequencies that will be restored by the convolution process of the present invention.
Figure 2C:
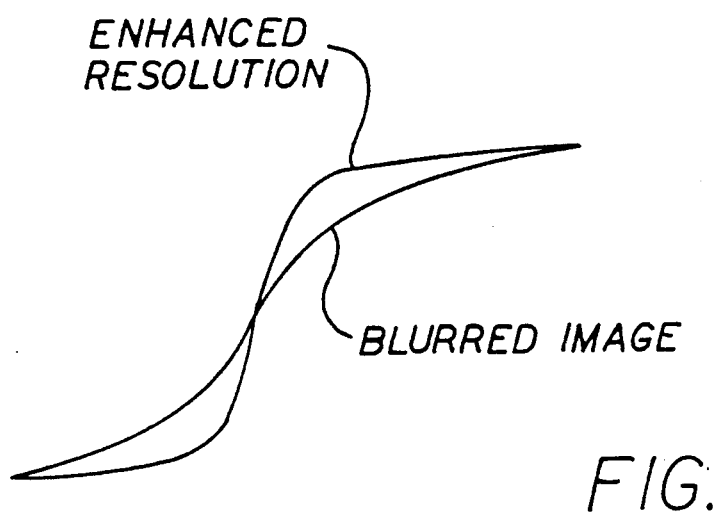
FIG. 2(c) shows an enhanced (blur suppressed) image resulting from the deconvolution process employed in the preferred embodiment of the present invention.

The filtering technique of the preferred embodiment is illustrated by FIG. 2(a) through FIG. 2(c). FIG. 2(a) shows the intensity of an image as a function of the position of the image across the image plane of the camera 12, for an original object (solid line) having a sharp edge therein and a blurred image (dashed line) distorted from the original object by the point spread function of the camera 12. FIG. 2(b) illustrates that the high frequencies will be restored by the convolution process. The result is the enhanced (unblurred) image illustrated in FIG. 2(c) and fed to the display 18.

Figure 3:
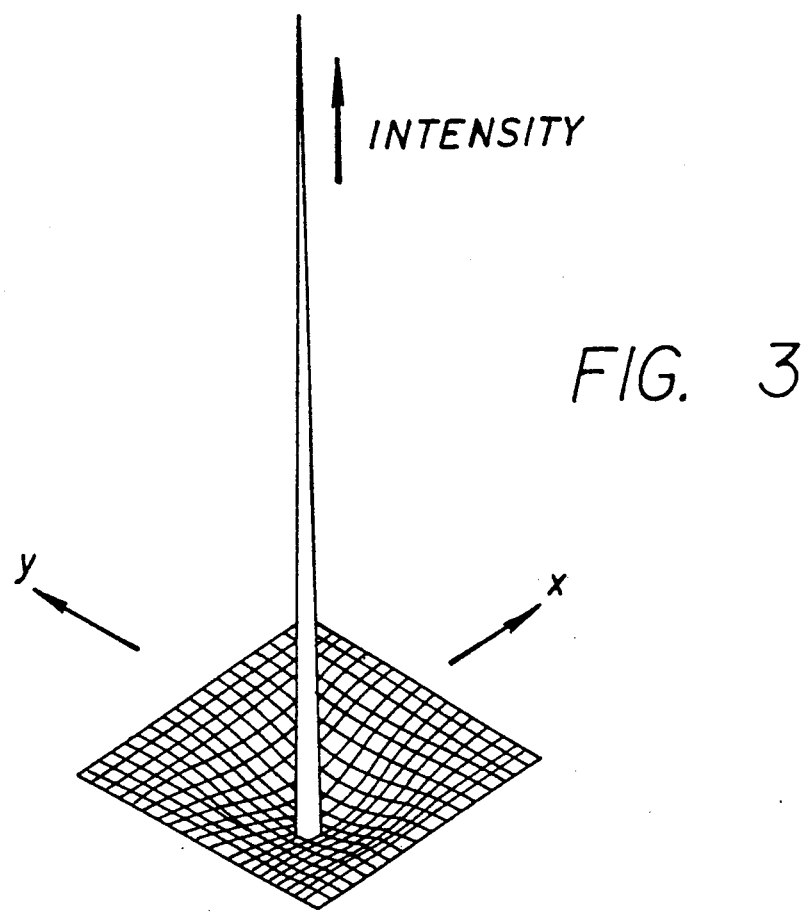
FIG. 3 is a graphic perspective view of a surface corresponding to the convolution mask used by the image processor of the imaging system of the present invention.

The deconvolver 30 effectively utilizes a convolution mask of the form shown in FIG. 3. The x-axis represents position along a first direction across the image plane of the camera 12 and the y-axis represents position along a second direction, normal to the first direction, across the image plane of the camera 12. The z-axis represents intensity. As described in the above-identified reference the mask approximates the inverse of the sensor degradation utilizing the negative of the point spread function plus a positive impulse function on the center pixel of weight 2, the aggregate weight of the entire mask being equivalent to unity.

Figure 4A:
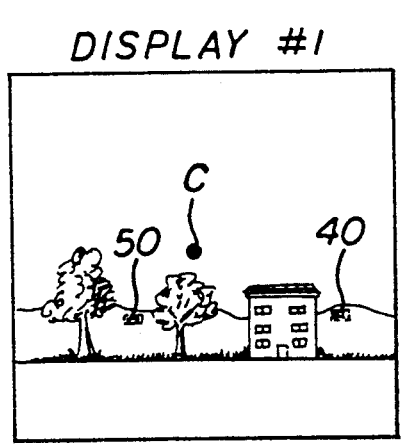
FIG. 4(a) and 4(b) illustrates an original image and the images generated on the display respectively by the image processor utilized in the imaging system of the present invention.
Figure 4B:
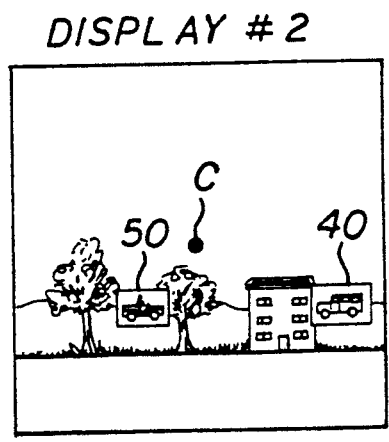

The enhancement of the original image from the camera 12 by the image processor 16 allows for simultaneous display of both the wide angle view including selected portions of the display 18 to show zoomed views in place with increased resolution and minimal blurring. FIG. 4(a) shows an original image as viewed by the camera 12 with portions 40 and 50 of the display 18 selected for zooming. FIG. 4(b) shows the enhanced image as viewed on the display 18 with the selected portions 40 and 50 magnified and with a higher resolution than the original image from camera 12.

While the present invention has been described herein with reference to an illustrative embodiment and a particular application, it is understood that the invention is not limited thereto. Those having ordinary skill in the art and access to the teachings of the present invention will recognize additional modifications and applications within the scope thereof. For example, the invention is not limited to the type of camera or the type of display used therewith. Further, the invention is not limited to a single display. Any number of displays and corresponding image processors may be utilized as necessary for the particular application. Also, the video enhancement is not limited to magnification. Any type of video enhancement may be provided as needed for the particular application.

It is therefore intended by the appended claims to cover any and all such modifications, applications and embodiments.

Accordingly,

What is claimed is:

1. An imaging system for providing first and second simultaneous real time images from a sensor for viewing on a display said image sensor providing a first set of electrical signals in response to inputs received thereby from a scene, said imaging system comprising:

processing means for processing said first set of electrical signals to provide a second set of electrical signals representative of said first and second simultaneous real time images, said first simultaneous real time image being a view of a portion of said scene represented by said first set of electrical signals and said second simultaneous real time image being a resolution enhanced view of a portion of said scene and display means for displaying said second simultaneous real time image within the display of said first simultaneous real time image in response to said second set of electrical signals.

2. The imaging system of claim 1 wherein said processing means includes resolution enhancing means for providing said enhanced view of at least one portion of said scene and format controller means for controlling said enhancing means.

3. The imaging system of claim 2 wherein said resolution enhancing means includes sampling rate means for selectively increasing a sampling rate of said image sensor.

4. The imaging system of claim 3 wherein said sampling rate means includes multiple image registration means for forming at least one multiply-registered video portion of a frame consisting of a mosaic of displaced subpixels from successive video frames generated by said image sensor.

5. The imaging system of claim 4 wherein said enhancing means includes frame memory means for selectively storing at least one portion of said multiply-registered video frame and said video frame generated by said image sensor as controlled by said format controller.

6. The imaging system of claim 5 wherein said enhancing means includes deconvolving means for selectively deconvolving said multiply-registered video frame and selectively deconvolving said video frame generated by said image sensor as controlled by said format controller to provide a set of deconvolved signals.

7. The imaging system of claim 6 wherein said deconvolving means includes means for deconvolving said portion of said multiply-registered video frame with the inverse of a point spread function associated with the degradations of said image sensor at said increased sampling rate.

8. The imaging system of claim 6 wherein said deconvolving means includes means for deconvolving said video frame generated by said image sensor with the inverse of a point spread function associated with the degradations of said image sensor.

9. The imaging system of claim 1 wherein said display means includes at least one display connected to said processing means and adapted for displaying a combination of portions of said scene and said enhanced views of portions of said scene.

10. The imaging system of claim 9 wherein said enhanced view of said scene is a magnified high-resolution view of a portion of said scene.

11. The imaging system of claim 9 wherein said enhanced view of said scene is a set of magnified high-resolution views of multiple separate portions of said scene.

12. An imaging system for providing first and second simultaneous real time images from an image sensor comprising:
   sensor means for providing a first set of electrical signals in response to inputs received thereby from a scene;
   processing means for processing said first set of electrical signals to provide a second set of electrical signals representing said first and second simultaneous real time images, said first simultaneous real time image being a view of a portion of said scene, said processing means including enhancing means for providing enhanced views of portions of said scene to provide said second simultaneous real time image and format controller means for controlling said enhancing means, said enhancing means including:
   means for effectively increasing a sampling rate of said sensor means,
   means for deconvolving the video resulting from said increased sampling rate of said sensor means with the inverse of a point spread function associated with the degradations of said sensor means to provide a set of deconvolved signals; and
   display means for displaying said second simultaneous real time image within the display of said first simultaneous real time image in response to said second set of electrical signals.

13. The imaging system of claim 12 wherein said means for effectively increasing a sampling rate of said sensor means includes multiple image registration means for forming a mosaic of displaced subpixels from successive video frames generated by said sensor means.

14. The imaging system of claim 13 wherein said means for effectively increasing a sampling rate of said sensor means includes frame memory means for selectively storing said mosaic of displaced subpixels from said multiple image registration means and for selectively storing portions of said scene represented by said first set of electrical signals.

15. The imaging system of claim 12 wherein said display means includes at least one display connected to said processing means and adapted to display a combination of portions of said scene and said enhanced views of portions of said scene.

16. The imaging system of claim 15 wherein said enhanced views are high-resolution magnified views of portions of said scene.

17. A method for providing first and second simultaneous real time images from an image sensor for viewing on a display including the steps of:
   providing a first set of electrical signals in response to inputs received thereby from a scene;
   processing said first set of electrical signals to provide a second set of electrical signals representative of said first and second simultaneous real time images, said first simultaneous real time image being a view of at least one portion of said scene and said second simultaneous real time image being a resolution enhanced view of at least one portion of said scene; and
   displaying said second simultaneous real time image within the display of said first simultaneous real time image in response to said second set of electrical signals.

18. An imaging system for providing first and second simultaneous real time images from a sensor for viewing on a display, said image sensor providing a first set of electrical signals in response to inputs received thereby from a scene, said imaging system comprising:
   processing means for processing said first set of electrical signals to provide a second set of electrical signals representative of said first and second simultaneous real time images, said first simultaneous real time image being a view of a portion of said scene represented by said first set of electrical signals and said second simultaneous real time image being an enhanced view of a portion of said scene, said processing means including enhancing means for providing said enhanced view of at least one portion of said scene and format controller means for controlling said enhancing means, said enhancing means including sampling rate means for selectively increasing a sampling rate of said image sensor, said sampling rate means including multiple image registration means for forming a multiply-registered video portion of a frame consisting of a mosaic of displaced subpixels from successive video frames generated by said image sensor and frame memory means for selectively storing said multiply-registered video frame and said video frame generated by said image sensor as controlled by said format controller and
   display means for displaying said second simultaneous real time image within the display of said first simultaneous real time image in response to said second set of electrical signals.

19. The imaging system of claim 18 wherein said enhancing means includes deconvolving means for selectively deconvolving said multiply-registered video frame and selectively deconvolving said video frame generated by said image sensor as controlled by said format controller to provide a set of deconvolved signals.

20. The imaging system of claim 19 wherein said deconvolving means includes means for deconvolving said multiply-registered video frame with the inverse of the point spread function associated with the degradations of said image sensor at said increased sampling rate.

21. The imaging system of claim 19 wherein said deconvolving means includes means for deconvolving said video frame generated by said image sensor with the inverse of the point spread function associated with the degradations of said image sensor.

22. The imaging system of claim 18 wherein said display means includes at least one display connected to said processing means and adapted for displaying a combination of portions of said scene and said enhanced views of portions of said scene.

23. The imaging system of claim 22 wherein said enhanced view of said scene is a magnified high-resolution view of a portion of said scene.

24. The imaging system of claim 22 wherein said enhanced view of said scene is a set of magnified high-resolution views of multiple portions of said scene.

25. An image processing system for processing first and second simultaneous real time images from a sensor, said sensor providing a first set of electrical signals in response to inputs received thereby from a scene, said processing system comprising:

processing means for processing said first set of electrical signals to provide a second set of electrical signals representative of said first and second simultaneous real time images, said first simultaneous real time image being a view of a portion of said scene represented by said first set of electrical signals and said second simultaneous real time image being a resolution enhanced view of a portion of said scene and image storage means for storing said second simultaneous real time image within a storage area of said first simultaneous real time image in response to said second set of electrical signals.

* * * * *